(12) United States Patent
Dakin

(10) Patent No.: US 9,746,585 B2
(45) Date of Patent: Aug. 29, 2017

(54) HYDROPHONE CALIBRATION SYSTEM

(71) Applicant: Ocean Networks Canada Society, Victoria (CA)

(72) Inventor: Del Thomas Dakin, Victoria (CA)

(73) Assignee: Ocean Networks Canada Society, Victoria (CA)

( * ) Notice: Subject to any disclaimer, the term of this patent is extended or adjusted under 35 U.S.C. 154(b) by 608 days.

(21) Appl. No.: 14/181,510

(22) Filed: Feb. 14, 2014

(65) Prior Publication Data

US 2015/0234089 A1    Aug. 20, 2015

(51) Int. Cl.
*G01V 13/00* (2006.01)

(52) U.S. Cl.
CPC .................................. *G01V 13/00* (2013.01)

(58) Field of Classification Search
USPC .......................................................... 367/13
See application file for complete search history.

(56) References Cited

U.S. PATENT DOCUMENTS

| | | | | |
|---|---|---|---|---|
| 2,918,651 A * | 12/1959 | Podolak | ................. | G01V 13/00 324/615 |
| 3,121,211 A * | 2/1964 | Eskin | ..................... | G01V 13/00 367/141 |
| 3,333,236 A * | 7/1967 | Schloss | .................... | G01S 1/72 310/337 |
| 3,352,144 A | 11/1967 | McMillian et al. | | |
| 3,548,631 A * | 12/1970 | Farmer | ................. | G01V 13/00 73/1.83 |
| 3,996,793 A * | 12/1976 | Topper | ................. | G01M 15/00 73/118.02 |
| 4,205,394 A * | 5/1980 | Pickens | ............... | H04R 29/005 367/13 |
| 4,325,427 A * | 4/1982 | Bramow | .............. | G05D 23/185 137/85 |
| 4,375,679 A * | 3/1983 | Park, Jr. | ................ | G01V 13/00 367/13 |
| H000206 H * | 2/1987 | Newhall | ............... | G01L 27/005 73/1.66 |
| 4,648,078 A * | 3/1987 | Darton | .................. | G01V 13/00 310/317 |
| 5,210,718 A * | 5/1993 | Bjelland | ............... | G01V 13/00 367/13 |
| 5,363,342 A * | 11/1994 | Layton | .................. | G01H 9/004 356/477 |

(Continued)

FOREIGN PATENT DOCUMENTS

CN    102155985    8/2011

OTHER PUBLICATIONS

Combined Search and Examination Report under Sections 17 and 18(3) from GB Application No. GB1405416.7, dated Sep. 15, 2014, 6 pages.

*Primary Examiner* — James Hulka
(74) *Attorney, Agent, or Firm* — Klarquist Sparkman, LLP

(57) ABSTRACT

Calibration apparatus including a pressure cap and a pressure base that define a pressure chamber that is fillable with a liquid. A reference sensor and a sensor under test are exposed to acoustic pressures in the liquid, and responses measured. The sensor under test is secured through one of the pressure cap or base, and responses measured at acoustic frequencies as low as 0.001 Hz and at hydrostatic pressures of at least 5000 psi.

16 Claims, 14 Drawing Sheets

(56) References Cited

U.S. PATENT DOCUMENTS

| | | | | |
|---|---|---|---|---|
| 5,654,937 A | * | 8/1997 | Striffler | G01V 13/00 367/13 |
| 5,712,828 A | * | 1/1998 | Luscombe | G01V 13/00 367/13 |
| 5,808,965 A | * | 9/1998 | Hull | G01V 13/00 367/13 |
| 6,318,497 B1 | * | 11/2001 | De Groot | G01V 1/201 181/110 |
| 6,788,618 B2 | * | 9/2004 | Clayton | G01V 1/006 367/13 |
| 7,249,487 B2 | * | 7/2007 | Alcoverro | G01H 3/005 73/1.57 |
| 2005/0241365 A1 | * | 11/2005 | Palmer | G01H 3/005 73/1.82 |
| 2005/0257598 A1 | * | 11/2005 | Alcoverro | G01H 3/005 73/1.57 |
| 2005/0284625 A1 | * | 12/2005 | Rodney | E21B 37/08 166/250.01 |
| 2010/0126261 A1 | * | 5/2010 | Ungaro | F02M 21/0248 73/114.48 |

* cited by examiner

SECTION A-A

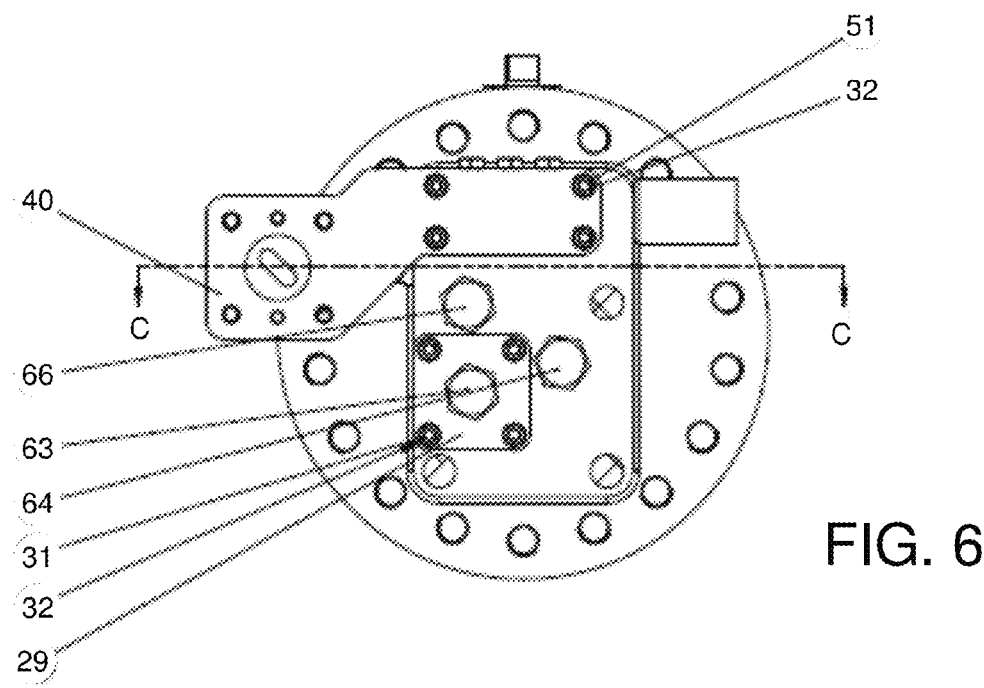
SECTION B-B
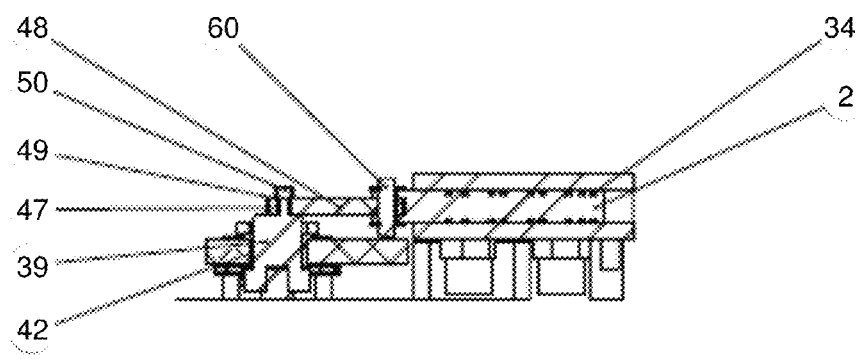
SECTION C-C

SECTION D-D

SECTION E-E

SECTION K-K

SECTION F-F

SECTION G-G

HYDROPHONE CALIBRATION SYSTEM

FIELD

The disclosure pertains to systems and methods for low frequency hydrophone calibration.

BACKGROUND

Most hydrophones are made from piezoelectric transducers that transform pressure waves impinging on the instrument into a voltage—this voltage, if calibrated correctly, gives a precise reading of pressure wave amplitude. Unfortunately a hydrophone does not produce the same output for a given acoustic amplitude at all acoustic frequencies. Therefore calibration data must be measured at many frequencies spanning the frequency range of the hydrophone.

Hydrophones play a large role for scientists and oceanographers in ocean research. The ability to monitor underwater acoustics allows for applications such as tracking whale activity, military purposes, and at very low frequencies, the assessment of earthquakes, underwater landslides, and turbidity currents. Digital hydrophones have now been developed to reach frequencies as low as 0.001 Hz. Presently hydrophone calibration facilities calibrate only the analog portion of a hydrophone system, and full end to end digital calibrations are not provided. This poses a problem for assessing the full system accuracy of both amplitude sensitivity and phase delays. It is desirable to measure both the sensitivity and phase delay at the temperatures and pressures that the hydrophone will be used at since the hydrophone sensitivity changes with both temperature and pressure. Low frequency (<15Hz) calibration systems are not available. A previously proposed system (U.S. Pat. No. 3,352,144 A) used cable gland seals that are unsuitable for high pressure use, and an insonification drive mechanism that is both noisy and limited to low static pressures.

SUMMARY

In one example, a very low frequency calibration system operates by comparing the response of the hydrophone under test and a reference sensor to acoustic pressures at various frequencies, sound pressure levels, temperatures, and hydrostatic pressures. This is accomplished by immersing the reference sensor and hydrophone under test inside a small volume, rigid walled pressure vessel and exposing both sensors to identical acoustic pressures. The acoustic pressure is derived from the reference sensor and the hydrophone under test output is measured, in counts for digital systems and in volts for analog sensors. The sensitivity at each frequency, sound pressure level, temperature and hydrostatic pressure point is then computed. The digital sensitivity is given by $M_D=10*\log_{10}(N^2/SPL^2)$, where $M_D$ is the digital sensitivity in dB re $Counts^2/\mu Pa^2$, N is the RMS counts, and SPL is the RMS sound pressure level in $\mu Pa$. The analog sensitivity is given by $M_V=10*\log_{10}(V^2/SPL^2)$, where $M_V$ is the voltage sensitivity in dB re $Volts^2/\mu Pa^2$, V is the RMS voltage, and SPL is the RMS sound pressure level in $\mu Pa$.

To ensure both sensors are exposed to the same acoustic pressure, within 0.1 dB re 1 $\mu Pa^2$, the maximum dimension within the pressurized vessel must be less than $\frac{1}{20}^{th}$ of a wavelength in the liquid. Thus the internal dimensions of the pressure vessel govern the maximum operating frequency of the calibration system.

Low frequency hydrophones are susceptible to thermal fluctuations. It is therefore necessary to limit the fluctuations, typically to less than 0.1° C. for the duration of the measurement. To accomplish this, the system is immersed in a temperature controlled bath and both the bath and pressure vessel temperatures are monitored.

For the system to operate at high static pressures it is necessary to seal all the sensors and actuator into the pressure vessel with robust high pressure seals. The seals must have low compliance to allow for sufficient acoustic pressure to be developed by the actuator. An over-pressure relief valve is necessary for safety. The actuator needs to be pressure balanced for repeatable results at various frequencies. If a differential pressure sensor is used as the reference sensor then it must be pressure balanced as well. Pressure balancing is achieved by partitioning the pressure vessel interior so that there are valve isolated chambers behind the actuator and differential pressure sensor. An automated valve system with fail safe operation is employed to prevent damage to sensors during pressurization and de-pressurization.

Insonification is achieved via an actuator that is composed of a piston sealed at the edges driven by a piezoceramic stack actuator. The isolated pressure balance chamber behind the piston contains the stack actuator and is filled with an electrically nonconductive liquid, such as oil. If the liquid within the test chamber, often water, is not the same as the liquid in the pressure balancing chamber then a membrane must be employed to keep the two liquids separated. A membrane must also be used to separate the liquid in the pressure balance chamber behind the reference sensor if a differential pressure sensor is used as the reference sensor.

Typically the piston actuator and valves are automatically controlled by a computer interface. The temperature and pressure can be either computer or manually controlled. However, the hydrostatic pressure and temperature should be monitored by the control system so that the calibration can be paused, aborted or automatically pressure equalized should the need arise. At low hydrostatic pressures it is necessary to de-gas the liquids in the pressure vessel to prevent bubbles in the pressure vessel during calibrations at elevated temperatures.

Apparatus for hydrophone calibration comprise a pressure base and a pressure cap configured to define a pressure chamber. The pressure cap has an aperture configured to expose a hydrophone under test to the pressure chamber and the pressure base is configured to retain a reference sensor so as to be exposed to the pressure chamber. Typically, the pressure base and the pressure cap are coupled so as to retain a liquid in the pressure chamber. A transducer piston is exposed to the pressure chamber so as to insonify liquid retained in the pressure chamber, and at least one seal is situated to expose a hydrophone under test to the pressure within the chamber. In this example, a longest dimension of the pressure chamber is less than 15 cm to allow the system to operate up to 500 Hz. The pressure base and pressure cap are coupled so as to retain a liquid in the pressure chamber at pressures of at least 5000 psi. In some examples, a valve is situated to decouple the back side chambers of at least one of the reference sensor or the transducer piston from the pressure chamber during the test and couple the chambers for pressure equalization when required. In another example, one or more membranes are situated between the pressure chamber and secondary chambers to prevent mixing of dissimilar fluids. In some embodiments, a temperature sensor is situated so as to determine a temperature within the pressure chamber.

In other examples, apparatus include a pressure base and a pressure cap configured to define a pressure chamber. The pressure cap has an aperture configured to expose a hydrophone under test to the pressure chamber and the pressure base is configured to retain a reference sensor so as to be exposed to the pressure chamber. In some examples, the pressure base and pressure cap are coupled so as to retain a liquid in the pressure chamber. A transducer is configured to apply an acoustic pressure to the liquid via a piston, and a controller is configured to select a magnitude and frequency of the applied acoustic pressure and measure responses associated with the reference sensor and the hydrophone under test. In some examples, a temperature sensor is coupled to the controller. In still other examples, a thermal bath is thermally coupled to the pressure chamber, and a temperature sensor is coupled to the thermal bath. The controller is configured to apply the acoustic wave upon determination that a temperature difference between the thermal bath and the liquid in the pressure chamber is less than a specified limit. The differential temperature limit is determined by the hydrophone under test thermal response specification, for hydrophones capable of operating down to 1 mHz, the limit is typically 0.1 degrees Celsius. If the entire hydrophone under test cannot be immersed in the pressure chamber, a sealing and clamping mechanism is required to hold at least the active portion of the hydrophone in the pressure chamber. According to some examples, the controller is configured to apply acoustic pressures at frequencies of down to 0.001 Hz and a pressure sensor is coupled to the controller and situated to sense a hydrostatic pressure in the pressure chamber.

Methods comprise exposing a hydrophone under test and a reference sensor to a degassed liquid in a pressure chamber, and recording a hydrostatic pressure associated with the pressure chamber. Responses of the hydrophone under test and the reference sensor to acoustic pressures at a plurality of frequencies are recorded. The plurality of frequencies includes at least one frequency that is between 0.001 Hz to 5 Hz, and the temperature of the degassed liquid is stabilized by immersing the pressure chamber in a thermal bath.

The foregoing and other objects, features, and advantages of the invention will become more apparent from the following detailed description, which proceeds with reference to the accompanying figures.

BRIEF DESCRIPTION OF THE DRAWINGS

FIGS. 5-10 are additional sectional views of the hydrophone calibration fixture of FIG. 1.

DETAILED DESCRIPTION

Figure 1:
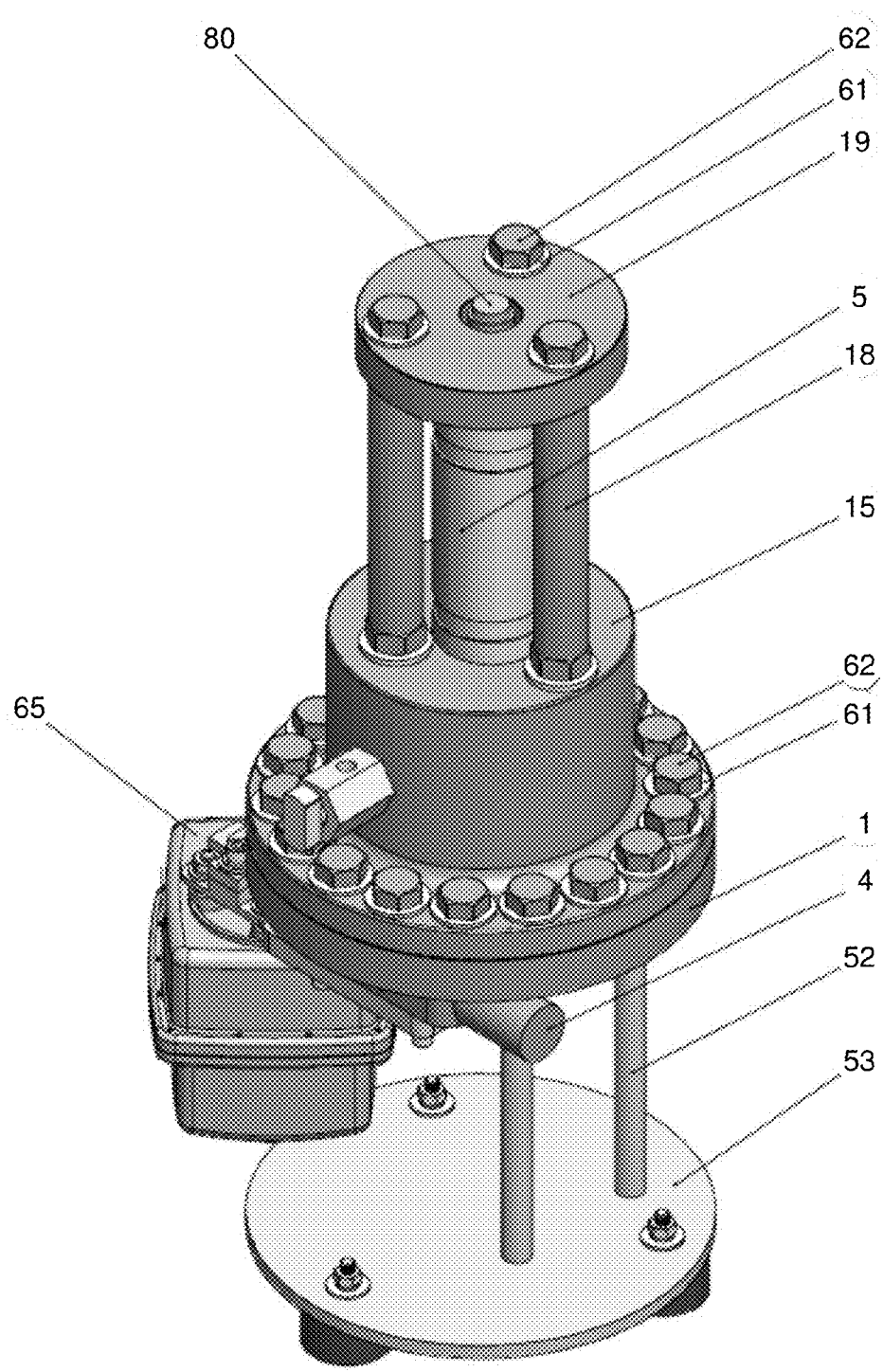
FIG. 1 is a perspective view of a representative hydrophone calibration fixture.
Figure 2:
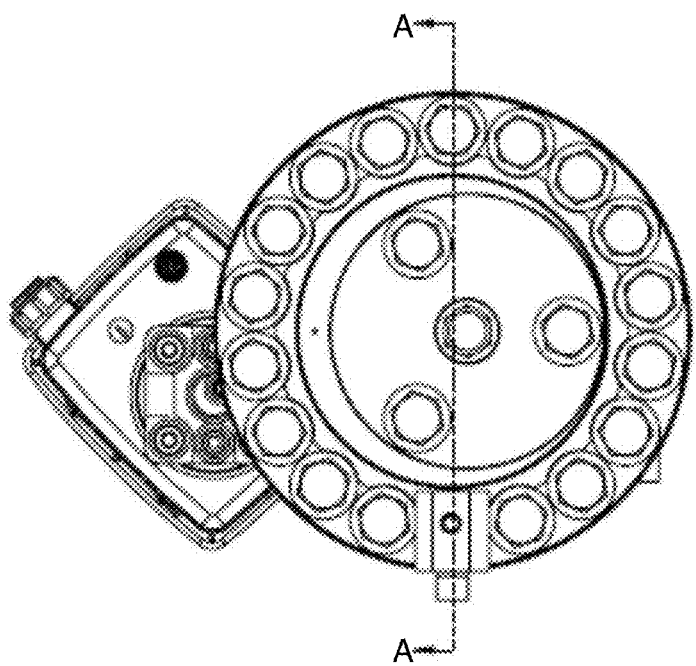
FIG. 2 is a top view of the hydrophone calibration fixture of FIG. 1.
Figure 3:
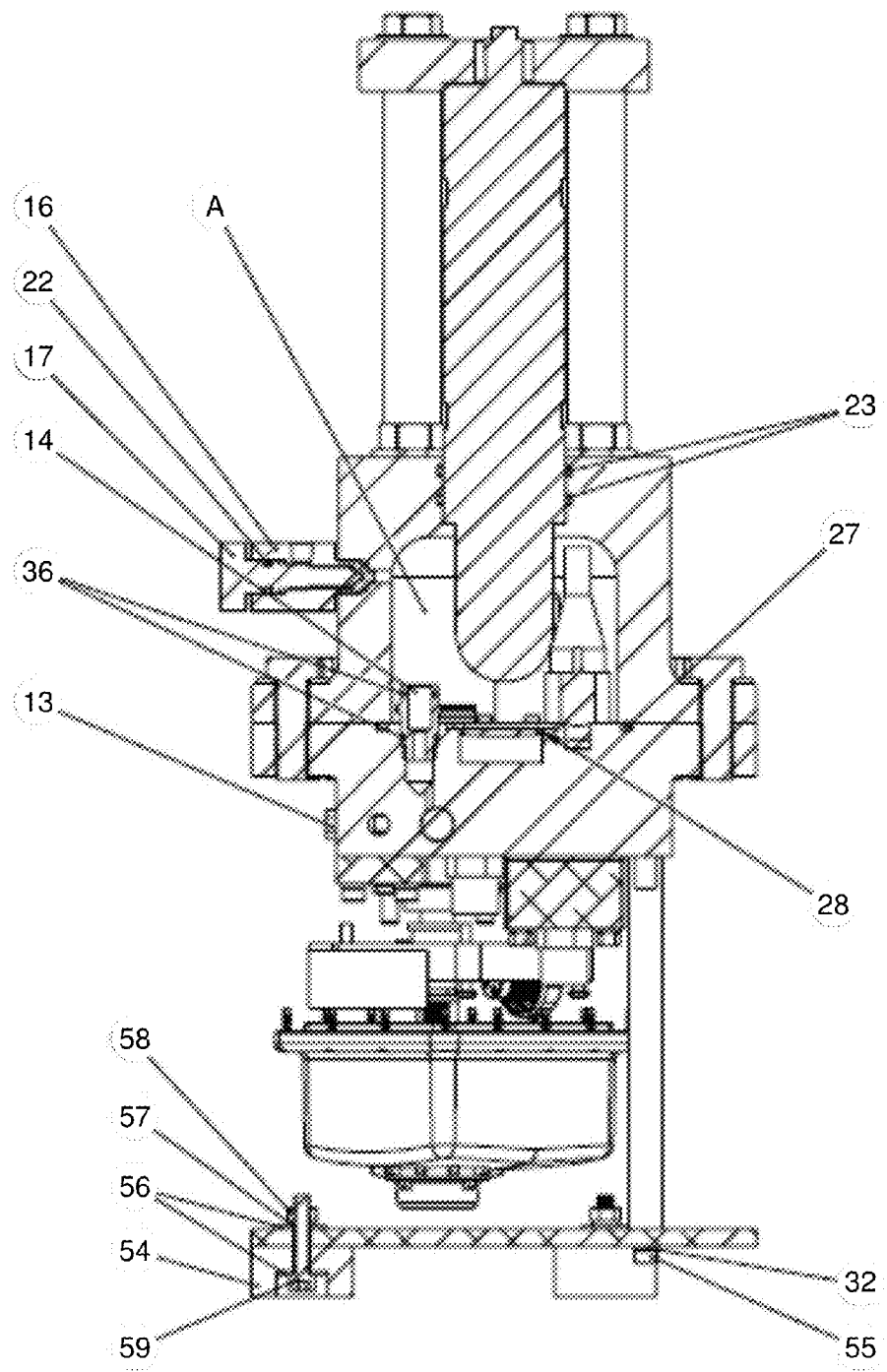
FIG. 3 is a sectional view of the hydrophone calibration fixture of FIG. 1.
Figure 4A:
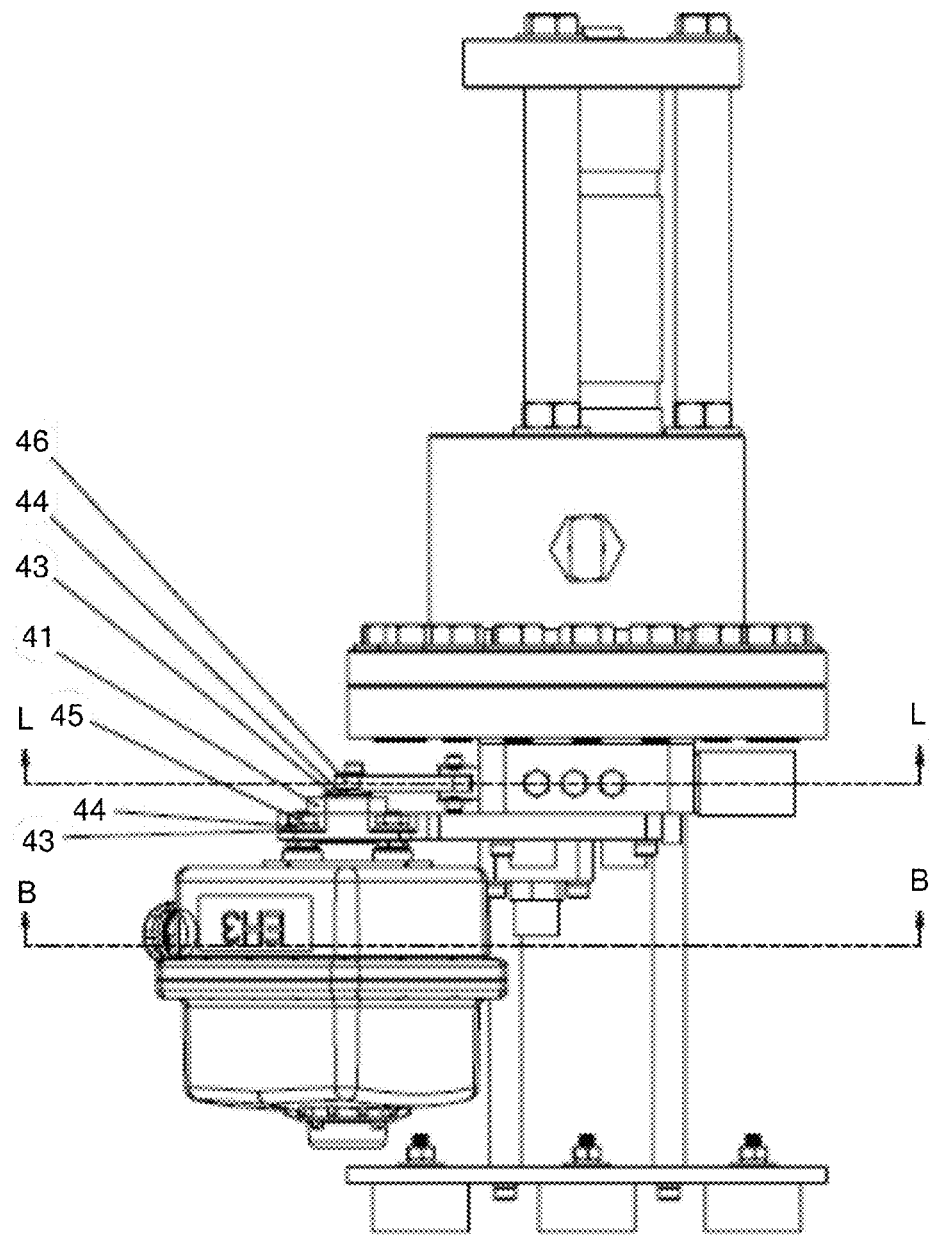
FIGS. 4A-4B are side views of the hydrophone calibration fixture of FIG. 1 illustrating locations of additional sectional views.
Figure 4B:
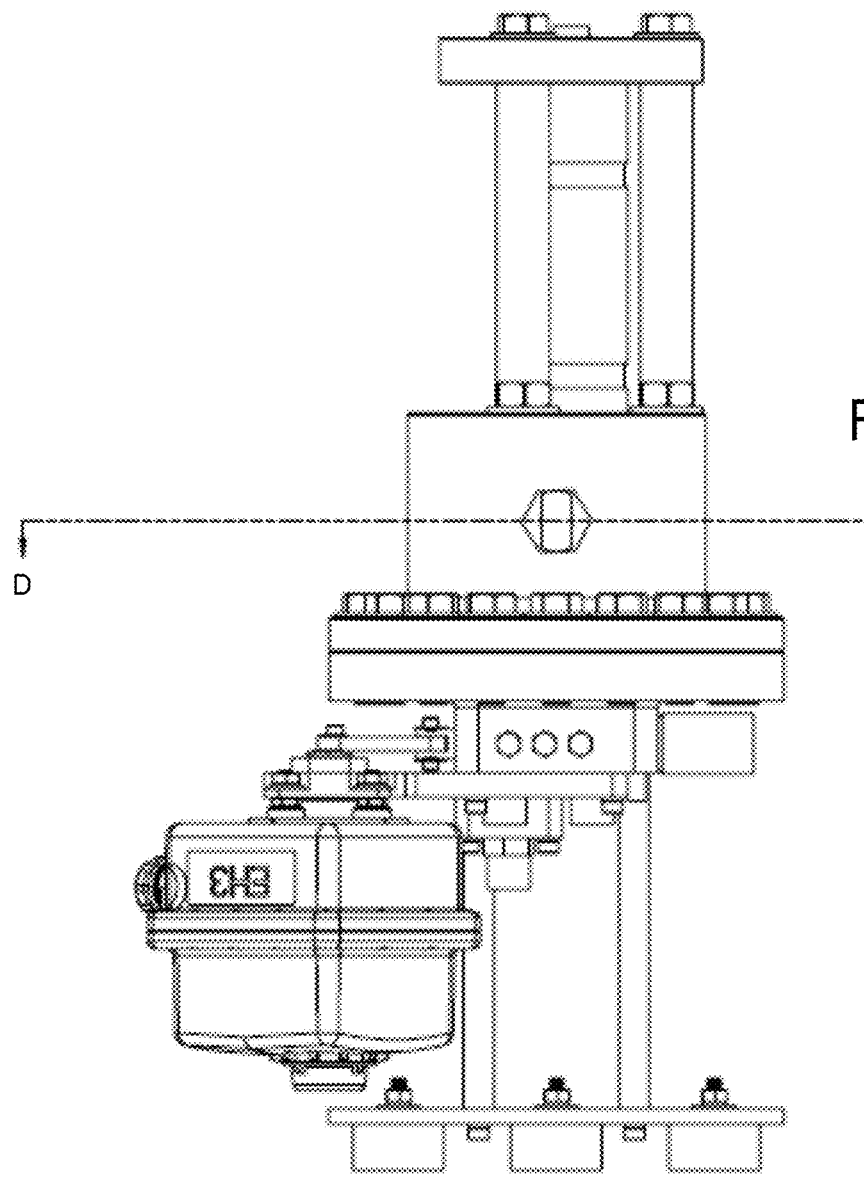
Figure 5:
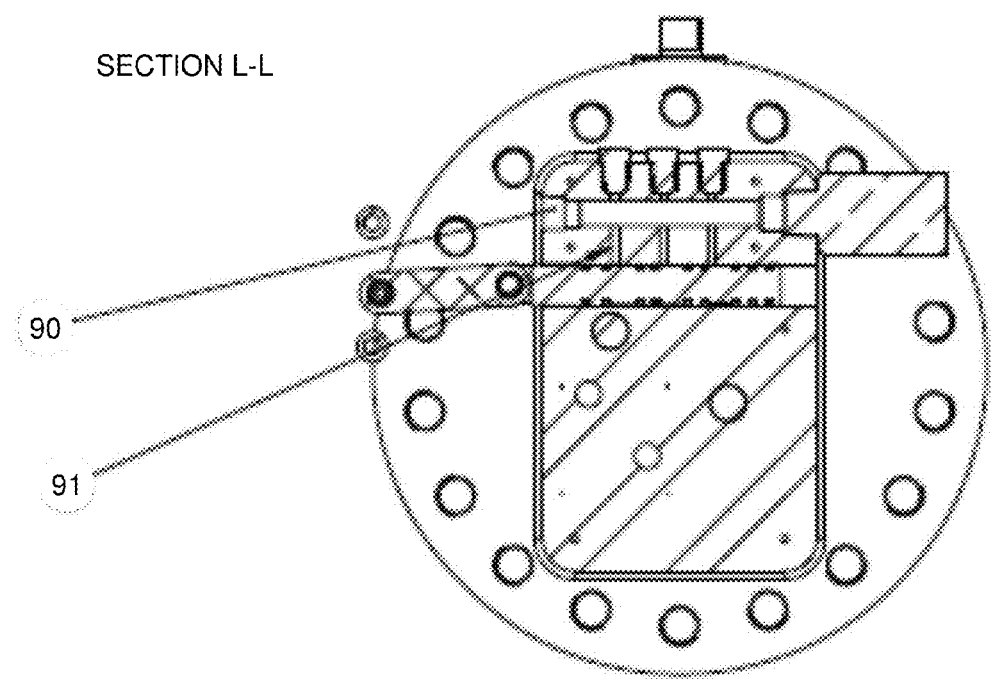

As used in this application and in the claims, the singular forms "a," "an," and "the" include the plural forms unless the context clearly dictates otherwise. Additionally, the term "includes" means "comprises." Further, the term "coupled" does not necessarily exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like, or indicated as "required" or otherwise necessary. It will be appreciated that such descriptions are intended to indicate that a selection among many used functional alternatives can be made, and such selections need not be better, smaller, or otherwise preferable to other selections.

Disclosed herein are methods and apparatus pertaining to very low frequency digital and analog hydrophone calibration in simulated ambient conditions. Calibration frequency ranges can include frequencies as low as or lower than 0.001 Hz, and in corresponding frequency ranges such as 0.001 Hz to 500 Hz. Calibration can be performed at high hydrostatic pressures and at temperatures from 1 to 40° C. For example, calibrations can be completed at pressures corresponding to ocean depths to simulate the environment at which they are deployed. In the disclosed approaches, calibration is based upon a calibration technique in which a calibrated reference sensor is compared against a test hydrophone under identical conditions, such as with an induced pressure within a common constrained water chamber. In typical examples, a piston activated, small tank comparison calibration methodology is adopted.

Some reference numerals and characters associated with the drawings are described in the table below for convenient reference.

| ITEM NO | DESCRIPTION |
|---|---|
| 1 | PRESSURE FITTING BASE |
| 2 | SLIDE VALVE |
| 3 | PIEZOMOTOR ACTUATOR |
| 4 | PRESSURE RELIEF VALVE |
| 5 | HYDROPHONE |
| 6 | PRESSURE SENSOR |
| 7 | TEMPERATURE SENSOR |
| 8 | TRANSDUCER PISTON |
| 9 | TRANSDUCER PISTON RING |
| 10 | DIFFERENTIAL PRESSURE MOUNT |
| 11 | M3-0.5 × 6 mm SOCKET HEAD CAP SCREW |
| 12 | M3-0.5 × 8 MM FH SOCKET |
| 13 | 1/16" HEX HEAD PLUG |
| 14 | LATEX PLUG |
| 15 | PRESSURE FITTING CHAMBER CAP |
| 16 | VACCUUM REDUCER TUBE |
| 17 | VACCUUM VENT SCREW |
| 18 | HYDROPHONE CLAMP POST 1 |
| 19 | HYDROPHONE HOLD DOWN CAP |
| 20 | HYDROPHONE |
| 21 | HYDROPHONE |
| 22 | 109 ORING |
| 23 | 134 ORING |
| 24 | HYDROPHONE CLAMP POST 2 |
| 25 | TC4032 ADAPTER RING |
| 26 | HYDROPHONE |
| 27 | 238 ORING |
| 28 | 1.5 × 40 mm ORING |
| 29 | ELECTRICAL COVER |
| 30 | ELECTRICAL COVER GASKET |
| 31 | M5-0.8 × 35 MM SOCKET CAP SCREW |
| 32 | M5 LOCK WASHER |
| 33 | 019 ORING |
| 34 | 012 ORING |
| 35 | 128 ORING |
| 36 | 013 ORING |
| 37 | M8E ADAPTER RING |
| 38 | 316 ORING |
| 39 | ACTUATOR SHAFT |
| 40 | ACTUATOR BRACKET |
| 41 | ACTUATOR BRACKET COVER PLATE |
| 42 | 3/4 × 7/8 FLANGED SLEEVE BEARING |
| 43 | 1/4" WASHER |
| 44 | 1/4" LOCK WASHER |
| 45 | 1/4-20 THIN HEX NUT |
| 46 | 1/4-20 × 3/4" SOCKET CAP SCREW |
| 47 | 1/4 × 1/4" SLEEVE BEARING |
| 48 | ACTUATOR ARM |
| 49 | #8 WASHER |
| 50 | 8-32 × 3/8 SOCKET CAP SCREW |
| 51 | M5-0.8 × 20 MM SOCKET CAP SCREW |
| 52 | BOTTOM STAND OFF |
| 53 | STANDOFF PLATE |
| 54 | RUBBER BUMPER |
| 55 | M5-0.8 × 12 MM SOCKET CAP SCREW |
| 56 | M6 LARGE DIAMETER WASHER |
| 57 | M6 LOCK WASHER |
| 58 | M6 HEX NUT |
| 59 | M6-1.0 × 30 mm SOCKET CAP SCREW |
| 60 | 1/4" HEADLESS CLEVIS PIN |
| 61 | 1/2" WASHER |
| 62 | 1/2-13 × 1-1/2" HEX BOLT |
| 63 | MICRO 8 CONTACT MALE CONNECTOR |
| 64 | MICRO 2 CONTACT MALE CONNECTOR |

-continued

| ITEM NO | DESCRIPTION |
|---|---|
| 65 | 90DEG ACTUATOR |
| 66 | MICRO 4 CONTACT MALE CONNECTOR |
| 67 | M16 WASHER |
| 80 | HYDROPHONE CONNECTOR |
| 101 | FEEDTHRU FOR PRESSURE SENSOR WIRES |
| 102 | FEEDTHRU FOR STACK ACTUATOR WIRES |
| 103 | PRESSURE PORT FOR PRESSURE SENSOR |
| 104 | PRESSURE PORT FOR STACK ACTUATOR |

Figure 8:
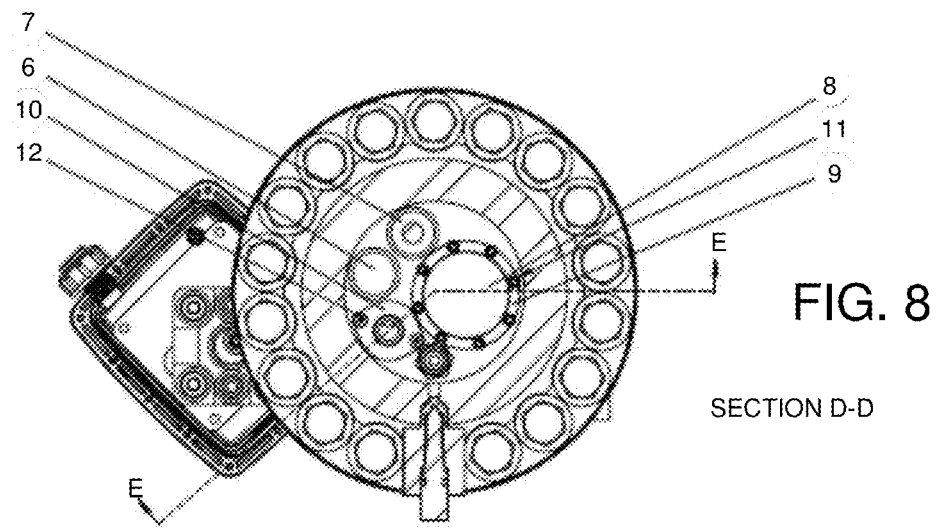
Figure 9:
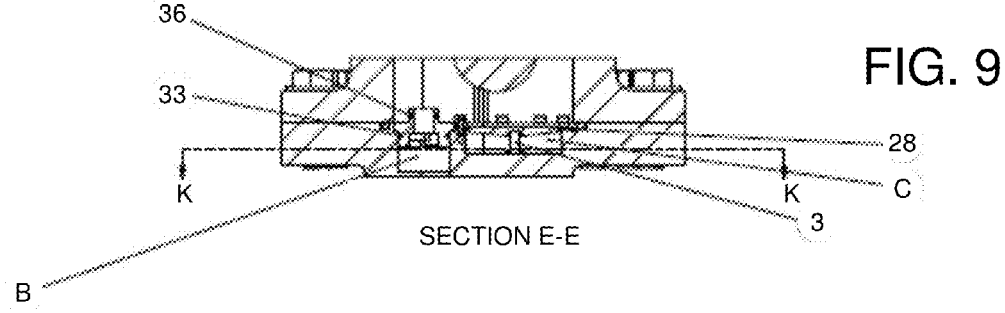
Figure 10:
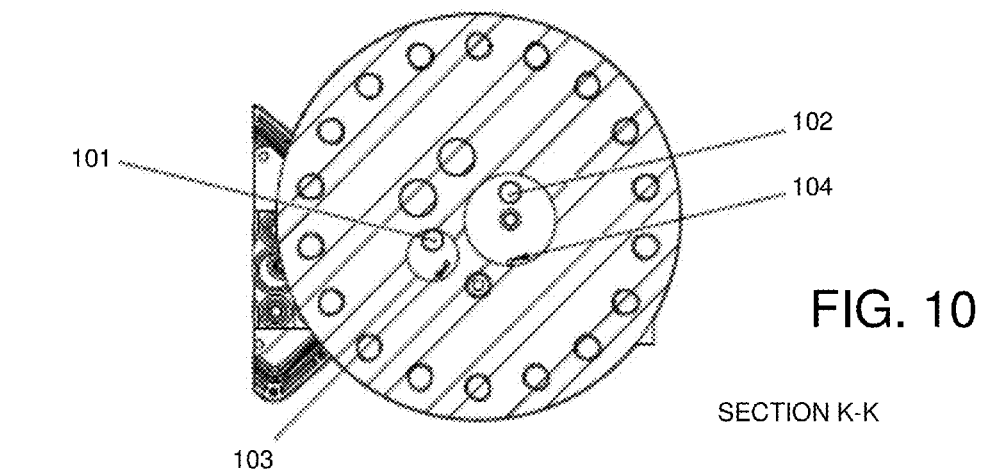
Figure 11:
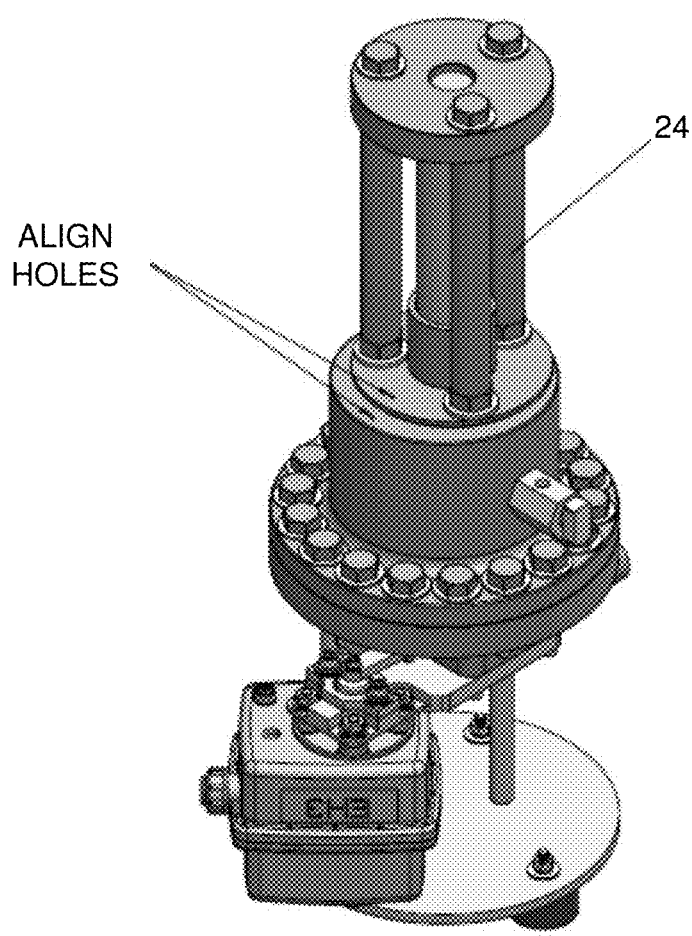
FIG. 11 is a perspective view of an alternative configuration of a hydrophone calibration fixture.
Figure 12:
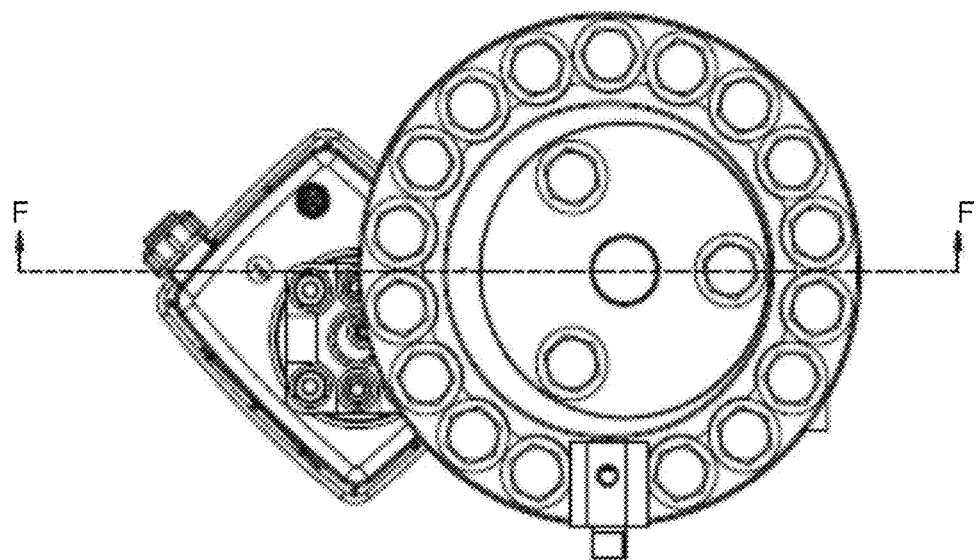
FIG. 12 is a top view of the hydrophone calibration fixture of FIG. 11 illustrating location of a sectional view.
Figure 13:
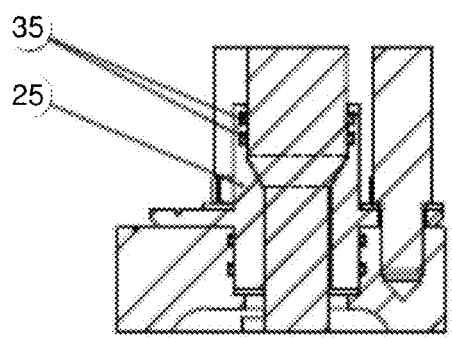
FIG. 13 is a sectional view of the hydrophone calibration fixture of FIG. 11.

Referring to FIGS. 1-10, a hydrophone calibration vessel includes an internal chamber A (see FIG. 3) that is defined by an interior surface for exposure of a hydrophone under test 5 and a reference sensor 10 to a fluid contained in the chamber A. A medium within the internal chamber A is insonified via a piston 8, shown in FIG. 8. An internal pressure sensor 6 and a temperature sensor 7 are shown in FIG. 8 and are also provided at the interior surface.

Shape, volume and diagonal dimensions of the internal chamber A define acoustical characteristics associated with an available calibration range. For induced pressure variations from the piston 8 to be essentially the same throughout the internal volume, a largest distance across the internal chamber A is preferably $\leq \lambda/20$ than the corresponding wavelength $\lambda$ in a medium (typically water) within the internal chamber A. For accurate measurements at 500 Hz in water, a largest diagonal dimension in the internal chamber A is preferably less than 15 cm.

Some conventional systems use long tube sections to connect a pressure input and a reference sensor. Such long port connections increase the longest internal dimension and thus limit the upper calibration frequency range. To reduce this effect, an isolating slide valve 2 (see FIG. 7) is placed proximate the internal chamber A, typically as close as possible. In one example, such a configuration permits a longest internal dimension to be no greater than about 13 cm. The longest path taken extends from the isolating piston valve 2, up to the top of the internal chamber A. A double O-ring seal 23 provides a pressure tight sealing for the hydrophone under test for a full internal pressure span (up to 3000 dBar). For configurations using digital hydrophones such as Ocean Sonics icListen digital hydrophones, a hydrophone cap 19 and clamp posts 18 are situated to secure a hydrophone under compression against the internal pressurization. Such systems are suitable for certification under American Society of Mechanical Engineers (ASME) Boiler and Pressure Vessel Code, Division 1.

Bubbles are preferably neither trapped nor allowed to form in any chambers or tubes. Bubbles increase the compliance of the system and reduce the maximum useable frequency. Bubbles also have resonant frequencies inversely proportional to their sizes, affecting pressure in the test chamber. To reduce any effects associated with bubbles, internal liquid should be degassed prior to beginning a calibration procedure. Vacuum degassing is generally convenient, and a tube 16 and vent screw 17 (see FIG. 3) are configured to serve as a valve at the top of the internal chamber A to permit degassing of the internal medium, such as oil or water. Typically it is easier to degas the liquid prior to filling the chamber A.

A plug 14 is covered by a rubber membrane and sealed with O-rings 38 to separate internal media between the main chamber A and the backsides of the reference sensor 10 and the piston 8, which are required to be filled with an electric isolating liquid. An array of bolts 62 and washers 61 constrains a main chamber cap 15 against a pressure base 1 and is sealed with an O-ring 27. Various pressure rated connectors 63, 64, 66 are situated to bring electrical conductors to a reference sensor chamber B (see FIG. 9), a stack actuator chamber C, and pressure and temperature sensors 6, 7. In order to clear the actuator and cable bend radius, stand-offs 52 and a base plate 53 are used. To reduce vibrations from the testing environment, rubber feet 54 are used on the bottom of the base plate 53.

Large thermal changes can occur whenever a new hydrophone is swapped into the system and wherever the chamber in pressurized. The introductions of high pressures (up to ~300 bar) can create a significant adiabatic temperature change. In order to compensate for this increased difficulty with reaching thermal equilibrium, a few added features are included. Firstly, the system in its entirety is submerged in a temperature-controlled bath. The use of polyurethane insulating balls on the water surface in the bath will help achieve thermal stability. This approach also allows for calibrations at multiple controlled temperatures, not just room ambient. Having calibrations at various temperatures helps define characteristics of hydrophones, which are often deployed at temperatures significantly lower than ambient room temperatures.

Another approach uses temperature sensors. The hydrophones and reference sensors are extremely sensitive to changes in temperature and can cause saturation of the output. The added internal temperature sensor 7 permits monitoring a differential temperature between an external bath and the internal testing chamber. This way, each time a new hydrophone is installed into the system, or thermal equilibrium is required, instrument control can monitor the difference between internal and external temperature conditions; allowing calibration data to be calculated only when the difference is less than a given parameter (for example, less than 0.1 degrees Celsius).

The automated slide valve 2 permits isolation between the main chamber, a backside of the reference sensor B, and a stack actuator chamber C. The slide valve 2 is controlled by an electric ball valve actuator 65, modified and mounted on an arm and bracket system 39-51 to allow for linear translation of the slide piston.

Next to the slide valve 2, another piston chamber with connecting ports 91 exists for the pressure input chamber 90 and the relief valve 4 required for system safety. Pressure can be induced through a hand-pump capable of 5000 psi or other pump. The pump can be provided with a fine-tuning feature to create the desired pressure, and a rough value of the induced pressure can be provided with an analog gauge attached to the pump. More accurate readings can typically be obtained from the sensor 6 located in the internal chamber A.

A stack actuator is driven by a high voltage amplifier, capable of providing voltages sufficient to drive the stack actuator, 0 to 700V in one example. The amplifier input signal is generated by an arbitrary waveform generator. A personal computer such as a laptop, desktop, handheld, or tablet can be used for generator and amplifier control so as to set frequency, amplitude, and offset of an applied sine wave or other signal. The personal computer is also configured so as to allow a user to specify a set of frequencies and amplitudes required for each calibration.

A mounting ring 9 and fasteners 11 are used to secure the insonifying piston 8 in compression against the stack actuator. An O-ring 28 is situated below the mounting ring 9 allows for micrometer translations needed on the piston to push energy into the main internal chamber. The chamber surrounding the stack actuator is filled with a high-grade non-conductive mineral oil, which is safer for the pressurization than an air filled cavity.

The calibration system is configured to be pressurized with the isolation valve open to allow the piston and reference sensor to be pressure balanced. This prevents or reduces damage to the piston and stack actuator as well as ensures the dynamic characteristics of sound pressure level for the piston remain essentially the same.

The differential pressure sensor (the reference sensor) is housed in a mount 10 located in the pressure-fitting base 1. The mount 10 is removable via two fasteners 12 to allow for repair. The user can switch between reference sensors with various sensitivities to provide calibrations at very low frequencies by allowing for much higher sound pressure level variations from the piston. The differential pressure sensor and instrumentation amplifier are typically integrated as a reference sensor and can be situated in the mount 10. The reference sensor is put through its own calibration process prior to use in the disclosed calibration systems. This calibration is necessary to obtain slope and offset characteristics of the sensor output after modifications to the casing and the introduction of the instrumentation amplifier.

Operation of the calibration system is provided by a personal computer or other processing system and suitable computer-executable instructions stored in non-transitory computer readable media such as RAM, ROM, flashdrives, or hard disks. A controller based on a processing system is configured to select frequency ranges, scan rates, collect and process data, display calibration data, and communicate data and instructions over a network. Typically, the control system is configured so that hydrophone and reference sensor outputs are captured simultaneously for a given number of cycles. The number of cycles captured is dependent on the frequency. The reference data is captured by an analog to digital converter or digital oscilloscope while the hydrophone data is collected over a TCP/IP connection. The calibration program also operates the isolating slide valve, which adds fail-safe measures to the pressurized calibration, reducing human error.

Graphical interfaces are configured to display variables pertaining to the calibration such as the hydrophone and reference outputs, sound pressure levels, sensitivity, temperature, and hydrostatic pressure. Such interfaces also allow the user to set and change parameters of the calibration such as hydrophone gain, frequency range, induced pressure level, reference sensor characteristics, and file storage names.

Various hydrophone types can be calibrated using adapters to couple and seal different styles of hydrophone. Adapter rings 25, 37 fit into the section designed for Ocean Sonic's icListen style hydrophones and are sealed with double O-rings 35, 38, The adapter rings 25, 37 are designed for analog hydrophones, but digital hydrophones can be used.

Figure 14:
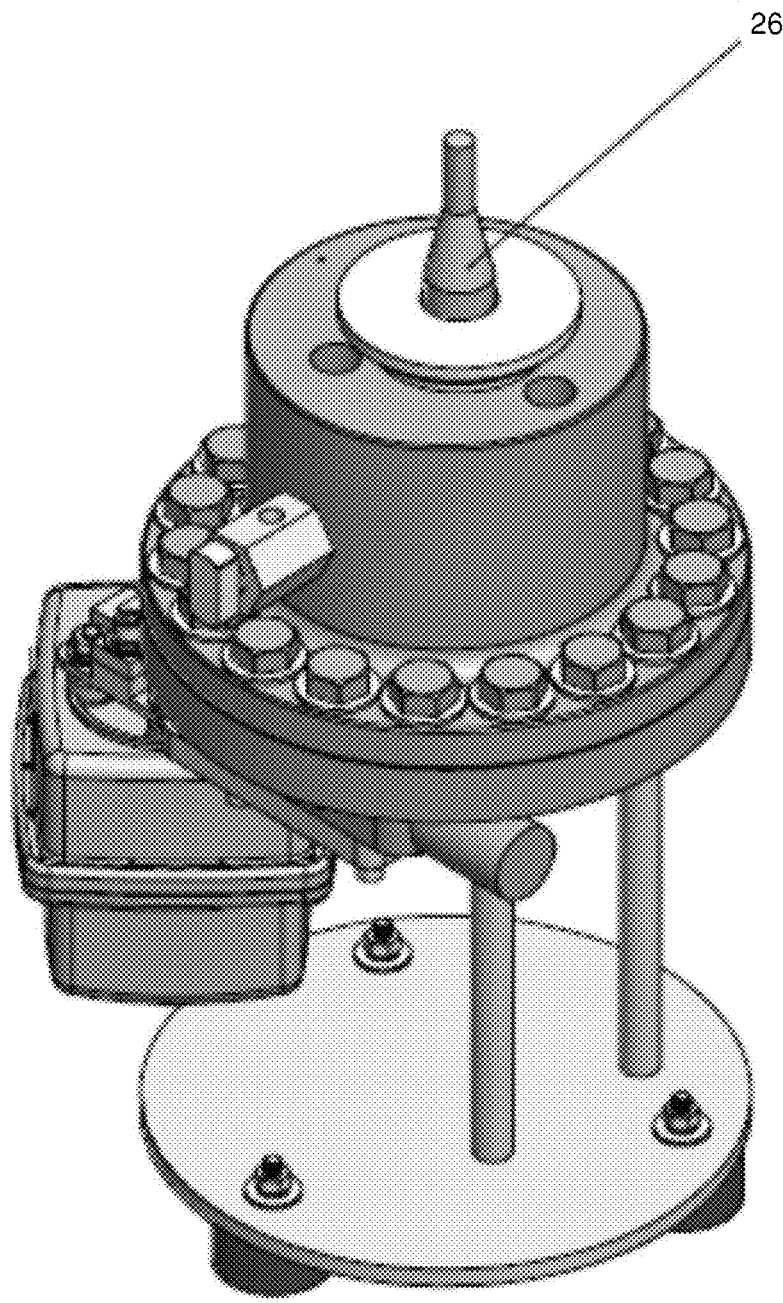
FIG. 14 is a perspective view of another alternative configuration of a hydrophone calibration fixture.
Figure 15:
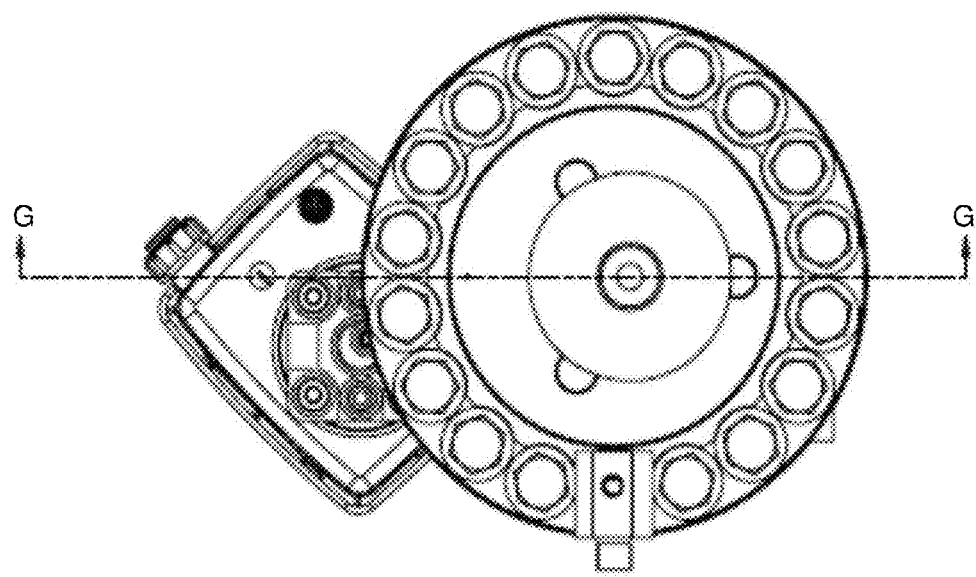
FIG. 15 is a top view of the hydrophone calibration fixture of FIG. 14 illustrating locations of a sectional view.
Figure 16:
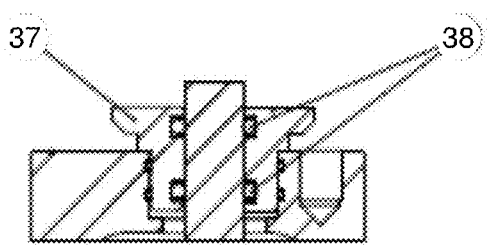
FIG. 16 is a sectional view of the hydrophone calibration fixture of FIG. 14.

FIGS. 11-16 illustrate additional calibration fixtures configured for other hydrophone designs. For example, the calibration fixture of FIGS. 14-16 is suitable for a GeoSpectrum M8E hydrophone and is designed to operate at atmospheric pressure without the clamp posts 18.

Figure 17:
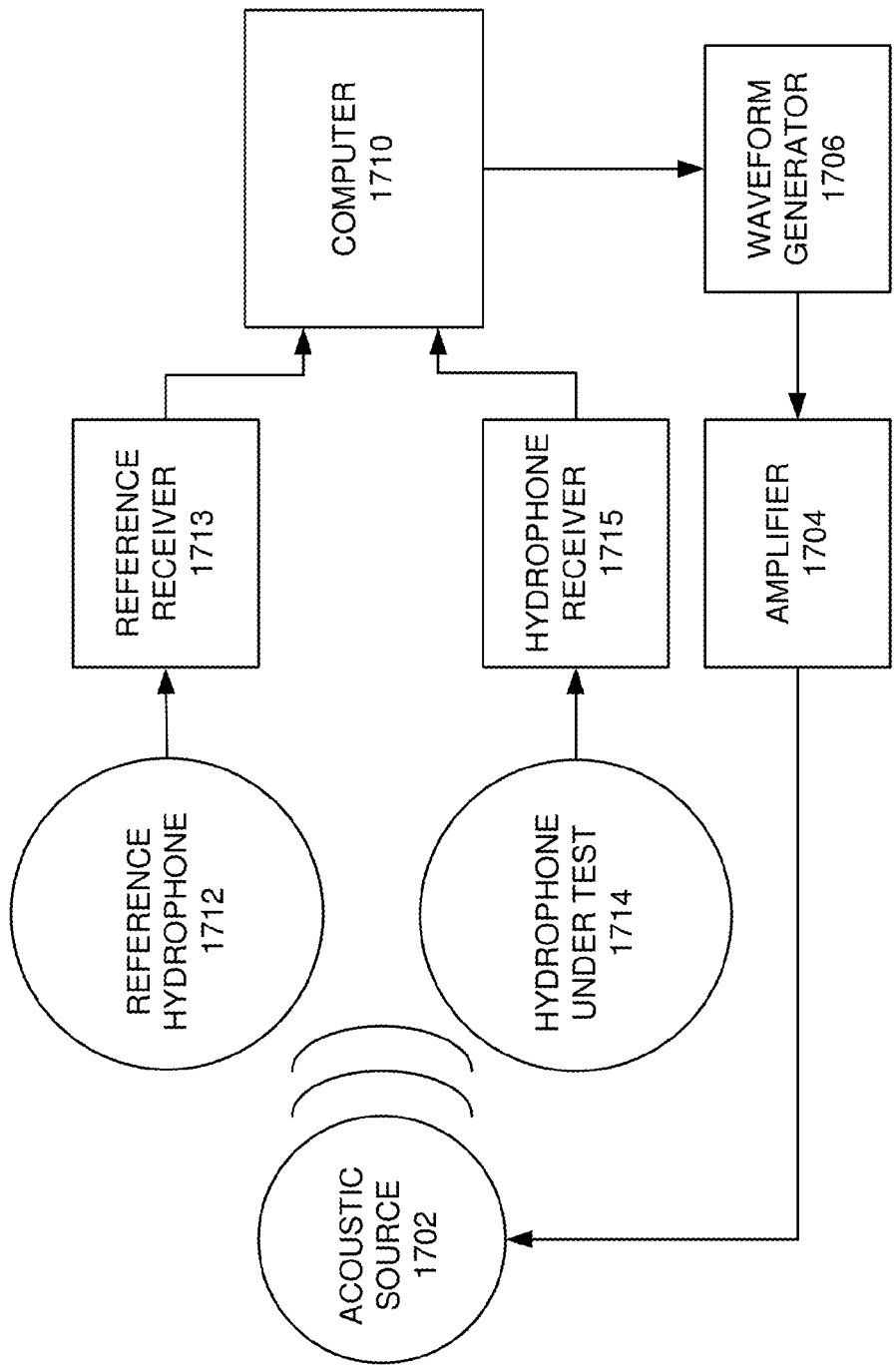
FIG. 17 illustrates a representative hydrophone calibration system including hydrophone calibration fixtures such as shown in FIG. 1.

A representative calibration system 1700 is illustrated in FIG. 17. An acoustic source 1702 is coupled to an amplifier 1704, and a waveform generator is situated to provide an electrical signal to be amplified and delivered to the acoustic source 1702. The waveform generator 1706 is generally configured as an arbitrary waveform generator and is controlled by a computer 1710 or other processing system so as to produce suitable acoustic signal amplitudes and spectra. A reference hydrophone 1712 and a test hydrophone 1714 are coupled to receivers 1713, 1714, respectively, that are in turn coupled to the computer 1710 to permit data analysis, display, and system control.

The reference hydrophone is generally provided with a sensitivity plot that permits conversion of reference output at any frequency to an acoustic pressure in µPa RMS or intensity in dB re 1 µPa$^2$. For example, if the reference sensitivity is −172 dB re V$^2$/µPa$^2$ (equivalent to $10^{(-172/20)}$ =2.51 nV/µPa), and the output of the hydrophone is 20 mV RMS then the acoustic pressure in the water is 20 mV/2.51 nV/µPa=7.97 Pa RMS and the intensity is $10*\log_{10}((7.97$ E6µPa)$^2$/(1 µPa)$^2$)=138 dB re 1 µPa$^2$.

When using a pressure sensor as a reference sensor, the acoustic pressure is simply the RMS pressure. The acoustic intensity is $10*\log_{10}$ ((Pressure µPa)$^2$/(1 µPa)$^2$). The squared ratio of the output of the hydrophone under test to the acoustic pressure as measured by the reference sensor is the sensitivity of the hydrophone under test at that frequency. The sensitivity is given in dB re V$^2$/µPa$^2$ for analog hydrophones or in dB re Counts$^2$/µPa$^2$ for digital hydrophones. As an example, if a digital hydrophone were exposed to 7.97 Pa RMS of pressure and produced 23000 counts RMS for its output, then the pressure sensitivity is 23000/7.97 E6=0.00289 counts per µPa and the intensity sensitivity is $10*\log 10(0.00289^2/1^2)$=−50.8 dB re Counts$^2$/µPa$^2$.

Figure 18:
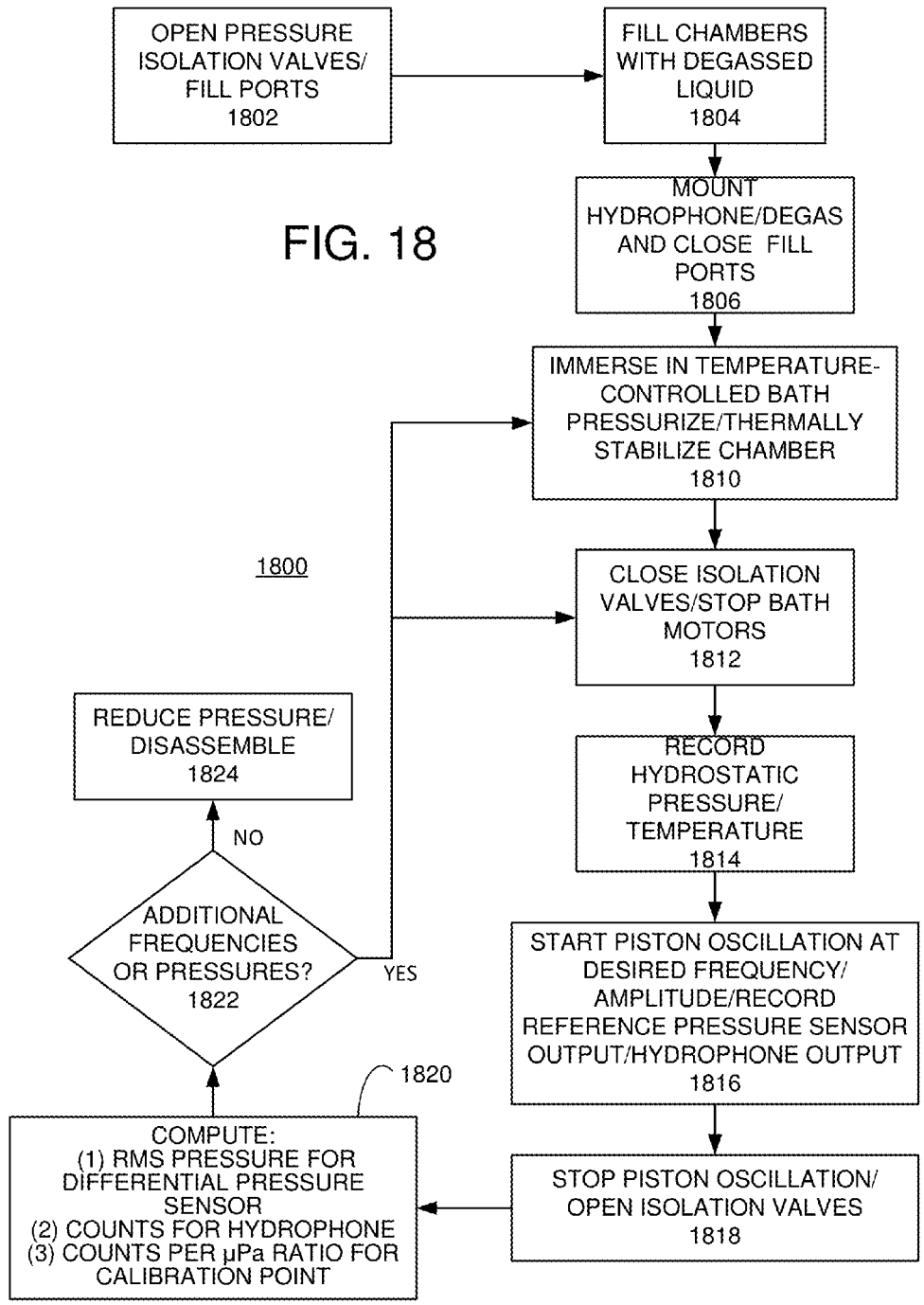
FIG. 18 is a block diagram of a representative method of hydrophone calibration based on a hydrophone calibration fixture such as shown in FIG. 1.

A representative calibration method 1800 is illustrated in FIG. 18. At 1802, pressure isolation valves and fill ports are opened. At 1804, chambers are filled with degassed liquid such as oil or water. At 1806, a hydrophone is mounted into the apparatus, and the liquid is degassed again prior to closing the fill ports. At 1810, the calibration vessel is immersed in a temperature-controlled bath, and test chamber is pressurized and thermally stabilized, typically to within ±0.1° C. of a target temperature. At 1812, isolation valves are closed and any temperature-controlled bath motors are stopped. At 1814, hydrostatic pressure and temperature are recorded. Piston oscillation at a selected frequency and amplitude is initiated at 1816, and reference sensor and hydrophone outputs are recorded. Piston operation is halted at 1818, and the isolation valves are opened. RMS pressure for the differential pressure sensor and RMS counts for the hydrophone are recorded at 1820. In addition, a counts per µPa ratio for the calibration point is calculated. At 1822, a determination is made as to whether additional frequencies or pressures are to be used for measurements, and measurements repeated as needed. At 1824, pressure is reduced, and the apparatus is disassembled.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An apparatus, comprising:
    a pressure base and a pressure cap configured to define a pressure chamber, the pressure cap having an aperture configured to expose a hydrophone under test to the pressure chamber, the pressure base configured to retain a reference sensor so as to be exposed to the pressure chamber, wherein the pressure base and pressure cap are coupled so as to retain a liquid in the pressure chamber, wherein the pressure base and pressure cap are coupled so as to retain a liquid in the pressure chamber at pressures of at least 5000 psi;
    a transducer piston exposed to the pressure chamber so as to insonify liquid retained in the pressure chamber; and
    at least one clamp situated to seal a hydrophone under test with respect to the pressure cap.

2. The apparatus of claim 1, wherein a longest dimension of the pressure chamber is less than 15 cm.

3. The apparatus of claim 1, further comprising a valve situated to decouple at least one of the reference sensor or the transducer piston from the pressure chamber.

4. The apparatus of claim 3, wherein the valve is a slide valve.

5. The apparatus of claim 4, further comprising an actuator coupled to the slide valve.

6. The apparatus of claim 5, wherein the slide valve is secured to the pressure base.

7. The apparatus of claim 1, further comprising a temperature sensor situated so as to determine a temperature within the pressure chamber.

8. The apparatus of claim 1, further comprising a membrane situated to define a secondary chamber so that the transducer piston is exposed to the pressure chamber via the secondary chamber.

9. The apparatus of claim 8, wherein the pressure base is configured to expose a reference sensor to the pressure chamber via the secondary chamber.

10. The apparatus of claim 8, wherein the secondary chamber is filled with an oil.

11. An apparatus, comprising:
    a pressure base and a pressure cap configured to define a pressure chamber, the pressure cap having an aperture configured to expose a hydrophone under test to the pressure chamber and the pressure base is configured to retain a reference sensor so as to be exposed to the pressure chamber, wherein the pressure base and pressure cap are coupled so as to retain a liquid in the pressure chamber;
    a transducer configured to apply an acoustic pressure to the liquid; and
    a controller configured to select a magnitude and frequency of the applied acoustic pressure and measure responses associated with the reference sensor and the hydrophone under test.

12. The apparatus of claim 11, further comprising a temperature sensor, wherein the controller is configured to apply the acoustic wave based on a temperature reported by the temperature sensor.

13. The apparatus of claim 12, further comprising:
    a thermal bath thermally coupled to the pressure chamber; and
    a temperature sensor coupled to the thermal bath, wherein the controller is configured to apply the acoustic pressure upon determination that a temperature difference between the thermal bath and the liquid in the pressure chamber is less than a specified temperature difference limit; and
    at least one clamp situated to seal a hydrophone under test with respect to the pressure cap.

14. The apparatus of claim 13, wherein the controller is configured to apply acoustic pressures at frequencies of at least as low as 0.001 Hz.

15. The apparatus of claim 14, further comprising a pressure sensor coupled to the controller and situated to sense a pressure in the pressure chamber.

16. The apparatus of claim 13, wherein the temperature difference limit is less than or equal to 0.1 degrees Celsius.

* * * * *